US012799794B2

(12) United States Patent
Schneiderbanger et al.

(10) Patent No.: US 12,799,794 B2
(45) Date of Patent: Nov. 17, 2026

(54) SPINDLE DRIVE FOR A CLOSURE ELEMENT OF A MOTOR VEHICLE

(71) Applicant: Brose Fahrzeugteile SE & Co. Kommanditgesellschaft, Bamberg, Bamburg (DE)

(72) Inventors: Michael Schneiderbanger, Rattelsdorf (DE); Tobias Zwosta, Wilhelmsthal (DE); Daniela Schweizer, Coburg (DE); Marco Suess, Bamberg (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 390 days.

(21) Appl. No.: 18/575,152

(22) PCT Filed: Jun. 30, 2022

(86) PCT No.: PCT/EP2022/068055
§ 371 (c)(1),
(2) Date: Dec. 28, 2023

(87) PCT Pub. No.: WO2023/275240
PCT Pub. Date: Jan. 5, 2023

(65) Prior Publication Data

US 2026/0168305 A1 Jun. 18, 2026

(30) Foreign Application Priority Data

Jul. 1, 2021 (DE) ..................... 10 2021 117 042.7

(51) Int. Cl.
*F16H 25/24* (2006.01)
*E05F 15/622* (2015.01)
*F16H 25/20* (2006.01)

(52) U.S. Cl.
CPC ....... *E05F 15/622* (2015.01); *F16H 25/2418* (2013.01); *E05Y 2201/474* (2013.01);
(Continued)

(58) Field of Classification Search
CPC .................... F16J 15/164; F16J 15/008; F16H 2025/2034; F16H 2025/2031; F16H 25/2418; F16H 2025/2075; E05F 15/622
See application file for complete search history.

(56) References Cited

U.S. PATENT DOCUMENTS 9,689,188 B2 * 6/2017 Fischer ............... F16H 25/2418

FOREIGN PATENT DOCUMENTS

DE 202007002306 7/2008
DE 102008062391 6/2010
(Continued)

OTHER PUBLICATIONS

"DIN EN ISO 18064 2015-03-00," Termoplastische Elastomere-Nomenklatur und Kurzzeichen (ISO 18064:2014); Deutsche Fassung EN ISR 18064:2014. S. 1-11. URL<http://perinorm/Perinorm-Volltexte/2016-11_Grunbestand/CD21DE_06/2283967/2283967.pdf?>.

(Continued)

*Primary Examiner* — Gregory Robert Weber
(74) *Attorney, Agent, or Firm* — Pauly, DeVries Smith & Deffner LLC

(57) ABSTRACT

Various embodiments provide a spindle drive with a spindle-nut gear, wherein a spindle-side drive portion has a spindle, and a nut-side drive portion has a spindle nut, wherein a spindle drive housing is provided, wherein a inner tube runs telescopically in an outer tube, wherein a tube has an annular sealing arrangement and slides along the respective other tube of the spindle drive housing during performance of drive movements. The sealing arrangement has a first axial
(Continued)

ring portion and, axially adjacent thereto relative to the geometric spindle axis, a second axial ring portion, and on drive movements, the second axial ring portion is radially displaceable relative to the first axial ring portion between a sealing position in which a sealing effect of the sealing arrangement is greatest, and a lift-off position in which the sealing effect of the sealing arrangement is less than in the sealing position.

20 Claims, 4 Drawing Sheets

(52) U.S. Cl.
CPC ..... *E05Y 2800/12* (2013.01); *E05Y 2900/546* (2013.01); *F16H 2025/2075* (2013.01)

(56) References Cited

FOREIGN PATENT DOCUMENTS

| | | |
|---|---|---|
| DE | 102011118353 | 5/2013 |
| DE | 102011122316 | 6/2013 |
| DE | 102017117993 | 2/2019 |
| DE | 102018115774 | 1/2020 |
| DE | 102019114175 | 12/2020 |
| WO | 2023275240 | 1/2023 |

OTHER PUBLICATIONS

"German Search Report," for German Patent Application No. 102021117042.7 mailed Jul. 22, 2022 (6 pages).

"International Search Report and Written Opinion," for PCT Application No. PCT/EP2022/068055 mailed Sep. 14, 2022 (11 pages).

* cited by examiner

SPINDLE DRIVE FOR A CLOSURE ELEMENT OF A MOTOR VEHICLE

CROSS-REFERENCE TO RELATED APPLICATIONS

This application is a national stage application under 35 U.S.C. 371 of International Patent Application Serial No. PCT/EP2022/068055, entitled "Spindle Drive for a Closing Element of a Motor Vehicle," filed Jun. 30, 2022, which claims priority from German Patent Application No. DE 10 2021 117 042.7, filed Jul. 1, 2021, the disclosure of which is incorporated herein by reference.

FIELD OF THE TECHNOLOGY

Various embodiments relate to a spindle drive for a closing element of a motor vehicle.

BACKGROUND

The known spindle drive (DE 10 2017 117 993 A1), on which some embodiments are based, has the usual structural design with a spindle-nut gear, wherein also a drive motor is provided, downstream of which the spindle-nut gear is connected. A spindle-side drive portion, which comprises the drive spindle of the spindle-nut gear and here also the drive motor connected downstream of the spindle, and a nut-side drive portion comprising the spindle nut of the spindle-nut gear, are provided. The two drive portions can be adjusted, here by motor, relative to one another and are each connected to a drive connection for coupling to the motor vehicle and here for transferring the resulting linear drive movements. The known spindle drive furthermore has a spindle drive housing with an inner tube assigned to the nut-side drive portion and an outer tube assigned to the spindle-side drive portion. The outer tube has an annular sealing arrangement, circumferential to the geometric spindle axis, which slides on the inner tube during performance of drive movements.

SUMMARY

The proposed sealing arrangement effectively seals the interior of the spindle drive against liquid, e.g. rain or splash water, from the environment. It is however a challenge toreduce friction-induced wear on the sealing arrangement and friction-induced disruptive noise.

Various embodiments can be based on the problem of configuring and refining the known spindle drive such that the sealing arrangement is optimized with respect to wear and noise.

The above problem can be solved by various features described herein.

The spindle drive concerned may be assigned to any closing element of a motor vehicle. These include tailgates, boot lids, rear doors, side doors or similar. To this extent, the term "closing element" should be interpreted broadly in the present case.

A consideration is that during linear drive movements of the spindle drive between its retracted position and its extended position, the sealing arrangement partly lifts away from the tube on which it slides, for example the inner tube, in some embodiments during the majority of the movement of the outer tube relative to the inner tube. Thus the friction occurring during the relative movement between the sealing arrangement and the tube is reduced. To this end, the sealing arrangement is divided axially into two ring portions, one of which can be deflected radially outward, e.g. spread out, during the relative movement by the tube on which the sealing arrangement is guided, for example the inner tube, whereby the radial contact force of this ring portion during the relative movement can be reduced compared with that in the retracted position. In the retracted position, the ring portion is not however deflected and seals particularly effectively.

It is emphasized that instead of the inner tube, the outer tube may form the tube along which the sealing arrangement slides. Accordingly, here the outer tube would then deflect said ring portion radially inward, e.g. radially constrict it, during the above relative movement in order to reduce the radial contact force. Where the above-mentioned first variant, in which the sealing arrangement is fixed to the outer tube and slides along the outside of the inner tube, is discussed below, the statements also apply accordingly to the latter variant in which the sealing arrangement is fixed to the inner tube and slides along the inside of the outer tube.

In detail, it is proposed that the sealing arrangement has a first axial ring portion and, axially adjacent thereto relative to the geometric spindle axis, a second axial ring portion which is movably, in particular pivotably, connected to the first axial ring portion, and that on performance of drive movements, the second axial ring portion is radially displaceable, in particular pivotable, relative to the first axial ring portion between a sealing position in which a sealing effect of the sealing arrangement is greatest, and a lift-off position in which the sealing effect of the sealing arrangement is less than in the sealing position.

Various embodiments provide that an axial movement of the outer tube relative to the inner tube causes the radial displacement, in particular pivoting, of the second axial ring portion between the sealing position and the lift-off position. This therefore takes place automatically on drive movements of the spindle drive so no separate mechanism is necessary for this purpose.

In various embodiments, the second axial ring portion has an axial sealing portion which presses on the respective tube of the spindle drive housing with a greater radial contact force in the sealing position than in the lift-off position, i.e. is also displaced during the relative movement of the second ring portion. This sealing portion may also have a sealing lip which, in the lift-off position, in some embodiments, no longer touches the respective tube.

Various embodiments provide multiple segments which are arranged circumferentially next to one another to form the second axial ring portion, and are each displaceable or pivotable. "Each displaceable" means that each circumferential segment is displaceable independently of the adjacent circumferential segment. The circumferential segments may be separated from one another circumferentially or also be elastically connected together circumferentially, wherein the circumferential segments themselves are less elastic than the connection between them. This ensures a particularly efficient radial displacement of the second axial ring portion or sealing portion.

Various embodiments define materials of the first and/or second axial ring portion and/or circumferential segments. In some embodiments, a combination of a hard component and a soft component can be provided, i.e. two materials which differ in their elasticity and/or Shore hardness. The hard component then serves in particular as a function carrier, the soft component ensures the sealing function.

In various embodiments, the hard component has several webs spaced apart from one another circumferentially. The webs may be spaced apart from one another circumferentially in the sealing position and/or in the lift-off position. Thus the radial movements can be performed particularly easily.

Various embodiments provide an axial contact portion of the second axial ring portion and/or the circumferential segments, which cooperates with contact ribs of a running portion of the tube along which the annular sealing arrangement slides. During contact, the contact portion is pushed away by the contact ribs, whereby the second axial ring portion and/or the circumferential segments move radially, e.g. radially outwardly, into the lift-off position. A sealing portion without ribs adjoins the contact portion, and here the contact portion is not pushed away so that the second axial ring portion and/or the circumferential segments remain in or enter the sealing position.

In various embodiments, the webs have a swirl-like course relative to the geometric spindle axis, i.e. a course with an axial and a circumferential direction component. This guarantees that even with larger spaces between circumferentially adjacent webs, the circumferential segments can always come optimally into contact with the contact ribs.

Various embodiments concern a first axial movement of the outer tube relative to the inner tube which causes the radial displacement of the second axial ring portion from the sealing position into the lift-off position, and a corresponding opposite second axial movement of the outer tube relative to the inner tube which causes the radial displacement of the second axial ring portion from the lift-off position back into the sealing position.

Connection options for fastening the sealing arrangement to the respective tube, e.g. the outer tube, are provided herein.

Various embodiments provide the inner tube is connected to the nut-side drive portion and the outer tube is connected to the spindle-side drive portion.

Various embodiments include a twist lock between the inner tube and outer tube.

According to various embodiments, a drive unit is provided with a drive motor, downstream of which the spindle is connected, whereby a motorized drive force can be generated which acts on the two drive portions. Alternatively or additionally, at least one coil spring is arranged inside the inner tube and preloads the two drive portions against one another. In this way, a corresponding spring force, in particular a pressure force, as a drive force can cause or at least support an adjustment of the spindle drive. In particular, the optional drive motor may be supported by the spring force during adjustment of the spindle drive, in particular during extension in the case of a heavy tailgate as a closing element.

According to various embodiments, it is provided that the spindle drive housing radially surrounds the spindle-nut gear, the drive motor, the torsion tube, the spindle nut tube and/or the at least one coil spring. Thus the essential components of the spindle drive are optimally protected.

Various embodiments provide a spindle drive for a closing element of a motor vehicle, with a spindle-nut gear for performing linear drive movements of the spindle drive between a retracted position and an extended position, wherein a spindle-side drive portion of the spindle drive has a spindle of the spindle-nut gear, wherein a nut-side drive portion of the spindle drive has a spindle nut of the spindle-nut gear, wherein the two drive portions are each connected to a drive connection for coupling to the motor vehicle and in particular for transferring drive movements, wherein a spindle drive housing with an inner tube and an outer tube is provided, wherein the inner tube runs telescopically in the outer tube, wherein the outer tube or the inner tube has an annular sealing arrangement which is circumferential to the geometric spindle axis and slides along the respective other tube of the spindle drive housing during performance of drive movements, wherein the sealing arrangement has a first axial ring portion and, axially adjacent thereto relative to the geometric spindle axis, a second axial ring portion which is movably, in particular pivotably, connected to the first axial ring portion, and that on performance of drive movements, the second axial ring portion is radially displaceable, in particular pivotable, relative to the first axial ring portion between a sealing position in which a sealing effect of the sealing arrangement is greatest, and a lift-off position in which the sealing effect of the sealing arrangement is less than in the sealing position.

In various embodiments, an axial movement of the outer tube relative to the inner tube causes the radial displacement, in particular pivoting, of the second axial ring portion between the sealing position and the lift-off position.

In various embodiments, the second axial ring portion has an axial sealing portion which presses on the respective tube of the spindle drive housing with a greater radial contact force in the sealing position than in the lift-off position, in some embodiments, that the axial sealing portion has a sealing lip circumferential to the geometric spindle axis which presses on the respective tube of the spindle drive housing with a greater radial contact force in the sealing position than in the lift-off position.

In various embodiments, for displacement, in particular pivoting, of the second axial ring portion between the sealing position and the lift-off position, the second axial ring portion is formed by multiple circumferential segments which are arranged circumferentially next to one another and each displaceable, in particular pivotable about a geometric pivot axis tangential relative to the geometric spindle axis.

In various embodiments, the first axial ring portion and/or the second axial ring portion and/or the circumferential segments are each formed from a hard component and a soft component, which in particular together form an integral two-component injection molding, and, in some embodiments, that the sealing lip is formed from the soft component.

In various embodiments, the hard component is made from a metal or a plastic material which has a lower modulus of elasticity and/or a higher Shore hardness than the soft component, in particular a glass-fiber-reinforced plastic material or polyamide, and/or that the soft component is made from a permanently elastic plastic material which has a higher modulus of elasticity and/or a lower Shore hardness than the hard component, in particular an elastomer or liquid silicone.

In various embodiments, the hard component has several webs spaced apart from one another circumferentially. In some embodiments, the webs are embedded in the soft component or the soft component is applied onto the webs. In some embodiments, the soft component is arranged continuously circumferentially relative to the geometric spindle axis.

In various embodiments, the second axial ring portion and/or the circumferential segments each have an axial contact portion which juts out relative to the first axial ring portion and/or the geometric pivot axes, radially to the tube of the spindle drive housing along which the annular sealing arrangement slides on performance of the drive movements, and that the tube to which the axial contact portion juts out has an axial rest portion for sealing contact of the sealing portion, and an adjacent axial running portion which has axially extending contact ribs protruding radially relative to the axial rest portion. In some embodiments, the axial contact portion is formed by the hard component.

In various embodiments, the webs have a swirl-like course relative to the geometric spindle axis. In various embodiments, a first axial movement of the outer tube relative to the inner tube, resulting from a drive movement of the spindle drive from the retracted position in the direction of the extended position, causes the radial displacement, in particular pivoting, of the second axial ring portion from the sealing position into the lift-off position, in some embodiments, during the first axial relative movement, the axial contact portion comes into contact with the axial running portion such that the contact ribs deflect the second axial ring portion and/or the circumferential segments radially, in some embodiments, during the first axial relative movement, the deflection of the second axial ring portion and/or the circumferential segments causes the sealing lip to lift off the rest portion, and during the further course of the first relative axial movement be guided along the contact ribs, in particular radially spaced therefrom.

In various embodiments, a second axial movement of the outer tube relative to the inner tube, resulting from a drive movement of the spindle drive from the direction of the extended position into the retracted position, causes a return displacement, in particular a return pivoting, of the second axial ring portion from the lift-off position into the sealing position, in some embodiments, during the second axial relative movement, the axial contact portion comes out of engagement with the axial running portion such that the second axial ring portion and/or the circumferential segments can spring back radially, in some embodiments, during the second axial relative movement, the return springing of the second axial ring portion and/or the circumferential segments causes the sealing lip to come out of its lift-off state back into contact with the rest portion.

In various embodiments, the sealing arrangement, in particular via the first axial ring portion, is fastened axially and rotationally fixedly on the outer tube, and during performance of the drive movements, the second axial ring portion is displaceable, in particular pivotable, radially outwardly relative to the first axial ring portion from the sealing position into the lift-off position, or that the sealing arrangement, in particular via the first axial ring portion, is fastened axially and rotationally fixedly on the inner tube and during performance of the drive movements, the second axial ring portion is displaceable, in particular pivotable, radially inwardly relative to the first axial ring portion from the sealing position into the lift-off position. In some embodiments, the axially and rotationally fixed fastening takes place by a substance-bonded connection, in particular by gluing or molding, and/or an axially form-fitting connection, in particular latching.

In various embodiments, the inner tube is connected to the nut-side drive portion and the outer tube is connected to the spindle-side drive portion.

In various embodiments, a twist lock is provided between the inner tube and outer tube, in some embodiments the twist lock can be formed in that a torsion tube, which is rotationally fixed relative to the one of the tubes, in particular the outer tube, and axially fixed relative to the spindle, and a spindle nut tube which is rotationally fixed relative to the other of the tubes, in particular the inner tube, and axially fixed relative to the spindle nut, stand in form-fit engagement with one another, or that the inner tube and the outer tube themselves stand in form-fit engagement with one another. In various embodiments, the spindle-side drive portion has a drive unit with a drive motor, downstream of which the spindle is connected, and the drive unit and spindle-nut gear are arranged one behind the other along the geometric spindle axis, and/or that at least one coil spring is arranged inside the inner tube coaxially to the geometric spindle axis and preloads the two drive portions against one another. In some embodiments, a spring guide tube runs inside the at least one coil spring and at one of its ends is fixed to the spindle-side drive portion. In some embodiments, the spring guide tube is formed by the torsion tube.

In various embodiments, the spindle drive housing radially surrounds the spindle-nut gear, the drive motor, the torsion tube, the spindle nut tube and/or the at least one coil spring, in particular over their entire axial extent.

BRIEF DESCRIPTION OF THE DRAWINGS

Various aspects are presented in more detail below with reference to a drawing showing purely exemplary embodiments. In the drawing.

DETAILED DESCRIPTION

Figure 1:
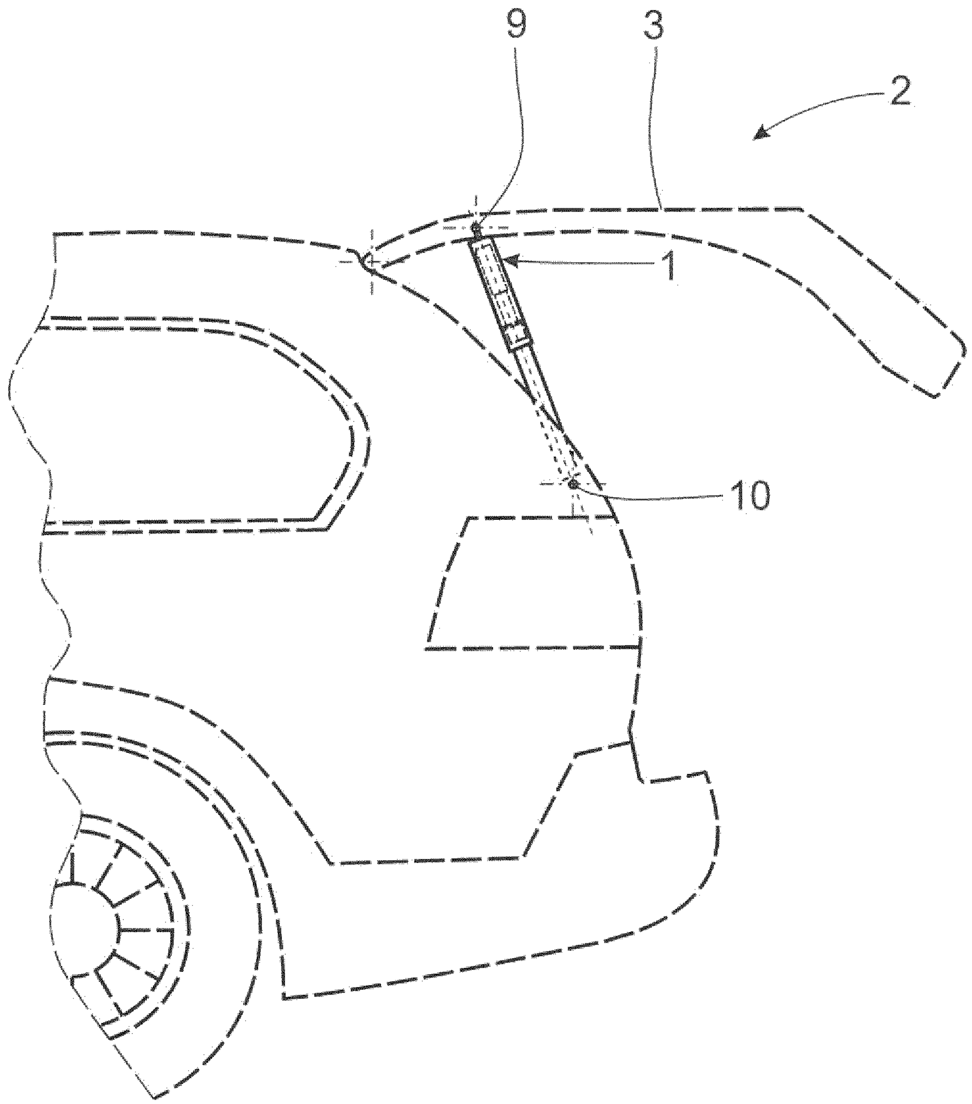
FIG. 1 shows the rear region of a motor vehicle with a spindle drive according to the proposal for the closing element present there.

The spindle drive 1 shown in the drawing is part of a closing element arrangement 2 with a closing element 3 of a motor vehicle. The term "closing element 3" in this case should be interpreted broadly, as explained in the introductory part of the description. In the present case, the closing element 3 is the tailgate of a motor vehicle. All statements concerning this also apply accordingly to all other types of closing elements 3.

The spindle drive 1 has a spindle-nut gear 4 (shown in FIG. 2) for performing or generating linear drive movements. The spindle-nut gear 4 is equipped in the usual fashion with a spindle 4*a* and a spindle nut 4*b* meshing with the spindle 4*a*. In the exemplary embodiment of a spindle drive 1 shown here, the spindle 4*a* is motor-driven, while the spindle nut 4*b* is twist-locked and therefore executes a linear drive movement according to the adjustment of the spindle 4*a*.

A spindle-side drive portion 5 of the spindle drive 1 comprises at least one spindle 4*a* of the spindle-nut gear 4, and, in some embodiments, also a drive unit 6 with an in particular electric drive motor 7, here connected downstream of the spindle 4*a*. The term "connected downstream" here always means that the downstream component is mechanically coupled to the upstream component.

It is emphasized that the proposed spindle drive 1 may also not comprise an above-mentioned drive unit with drive motor. This case is described as the passive side of the closing element arrangement 2. In the exemplary embodiment however, a drive unit 6 with drive motor 7 is provided, wherein it is described as the active side of the closing element arrangement 2. In principle, the closing element arrangement 2 may comprise only the one (active) or the other (passive) type of spindle drive, or a combination of both types of spindle drive.

A nut-side drive portion 8 of the spindle drive 1 comprises at least the spindle nut 4*b* of the spindle-nut gear 4.

When the optional drive motor 7 is actuated, accordingly a linear adjustment of the two drive portions 5, 8 takes place. In order to couple the drive portions 5, 8 to the motor vehicle and be able to transfer the linear drive movements generated by the motor, the spindle-side drive portion 5 is equipped with a spindle-side drive connection 9, and the nut-side drive portion 8 is equipped with a nut-side drive connection 10. The drive connections 9, 10 are, in some embodiments, configured as a ball cups which, in fitted state, are in engagement with respective ball heads on the vehicle side. Other types of drive connections are conceivable.

Figure 2:
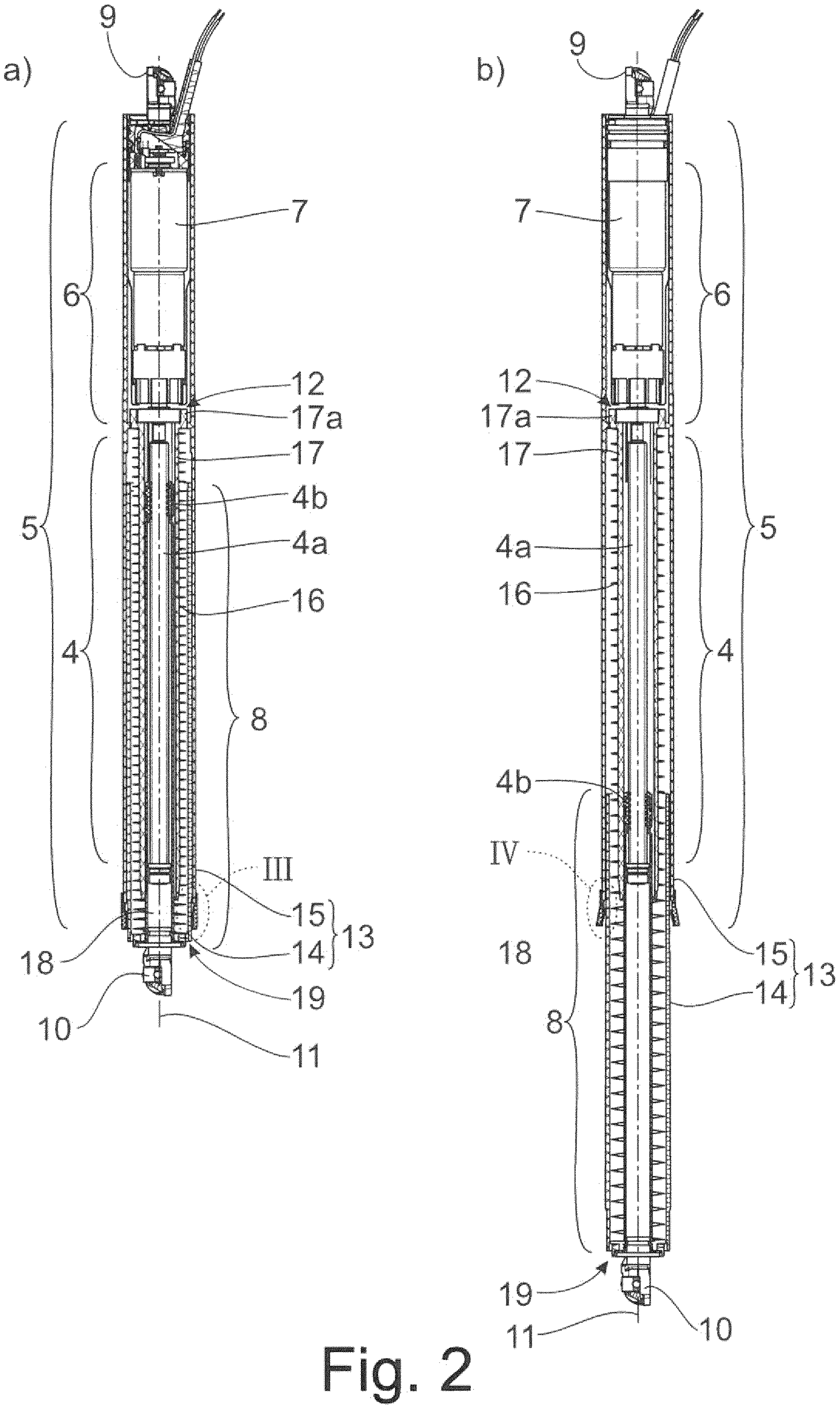
FIG. 2 shows a side sectional view of the spindle drive from FIG. 1 in a) the retracted position and b) the extended position.

As shown in the illustration of FIG. 2, the spindle-nut gear 4 and the optional drive unit 6 are arranged one behind the other along the geometric spindle axis 11. In some embodiments, this also applies to the drive connections 9, 10 which are also arranged on the geometric spindle axis 11.

In order to protect the interior 12 of the spindle drive 1 from external influences, a spindle drive housing 13 with an inner tube 14 and an outer tube 15 is provided, wherein the inner tube 14 runs telescopically in the outer tube 15.

The inner tube 14 is connected to the nut-side drive portion 8, while the outer tube 15 is connected to the spindle-side drive portion 5.

In some embodiments, at least one coil spring 16 is provided in the interior 12 of the spindle drive 1. In detail, a coil spring 16 is arranged inside the inner tube 14, coaxially to the geometric spindle axis 11, and preloads the two drive portions 5, 8 against one another. In some embodiments, the coil spring 16 preloads the two drive portions 5, 8 in the extended position shown in FIG. 2*b*). The reverse may also apply. The coil spring 16 can be configured as a coil compression spring.

In the exemplary embodiment shown in FIG. 2, only one coil spring 16 is assigned to the spindle drive 1. In principle however, two or more coil springs 16 may be provided which are each oriented coaxially to the geometric spindle axis 11.

It should be further emphasized that a torsion tube 17 runs inside the at least one coil spring 16, and is fastened at one end to the spindle-side drive portion 5. The torsion spring 17 firstly functions as a spring guide tube which supports the coil spring 16 in the radial direction relative to the geometric spindle axis 11 so as to avoid a corresponding radial deflection of the coil spring 16. The torsion tube 17 is however also part of a twist lock for the spindle nut 4*b* which can only travel axially on the torsion tube 17.

The illustration in FIG. 2 furthermore shows that the spindle nut 4*b* is connected to the nut-side drive connection 10 via a spindle nut tube 18.

It should be noted that the torsion tube 17 is fastened at one of its ends, here the spindle-side end 17*a*, to the spindle-side drive portion 5. This means that the torsion tube 17 is fixed relative to the linear adjustment of the nut-side drive portion 8 and hence the inner tube 14. Thus the free end 19 of the inner tube 19, facing away from the nut-side drive connection 10, runs along the torsion tube 17.

In some embodiments, furthermore the spindle drive housing 13 radially surrounds the spindle-nut gear 4, the drive motor 7, the torsion tube 17, the spindle nut tube 18 and/or the at least one coil spring 16, in particular over their entire axial extent.

To seal the interior 12 of the spindle drive 1 against moisture ingress, here the outer tube 15 (or the inner tube 14 in an alternative not illustrated) has an annular sealing arrangement 20 circumferential to the geometric spindle axis 11, which during performance of the drive movements, slides along the respective other tube, i.e. here the inner tube 14, of the spindle drive housing 13.

It is essential that the sealing arrangement 20 comprises a first axial ring portion 21 and, axially adjacent thereto relative to the geometric spindle axis 11, a second axial ring portion 22 which is connected movably, in particular pivotably, to the first axial ring portion 21, and that during performance of the drive movements, the second axial ring portion 22 is radially displaceable, in particular pivotable, relative to the first axial ring portion 21 between a sealing position, in which the sealing effect of the sealing arrangement 20 is greatest, and a lift-off position in which the sealing effect of the sealing arrangement 20 is less than in the sealing position.

Furthermore, in some embodiments, it can be provided that an axial movement of the outer tube 15 relative to the inner tube 14 causes the radial displacement, in particular pivoting, of the second axial ring portion 22 between the sealing position and the lift-off position. The displacement thus takes place automatically because of the drive movements of the spindle drive 1.

Figure 3:
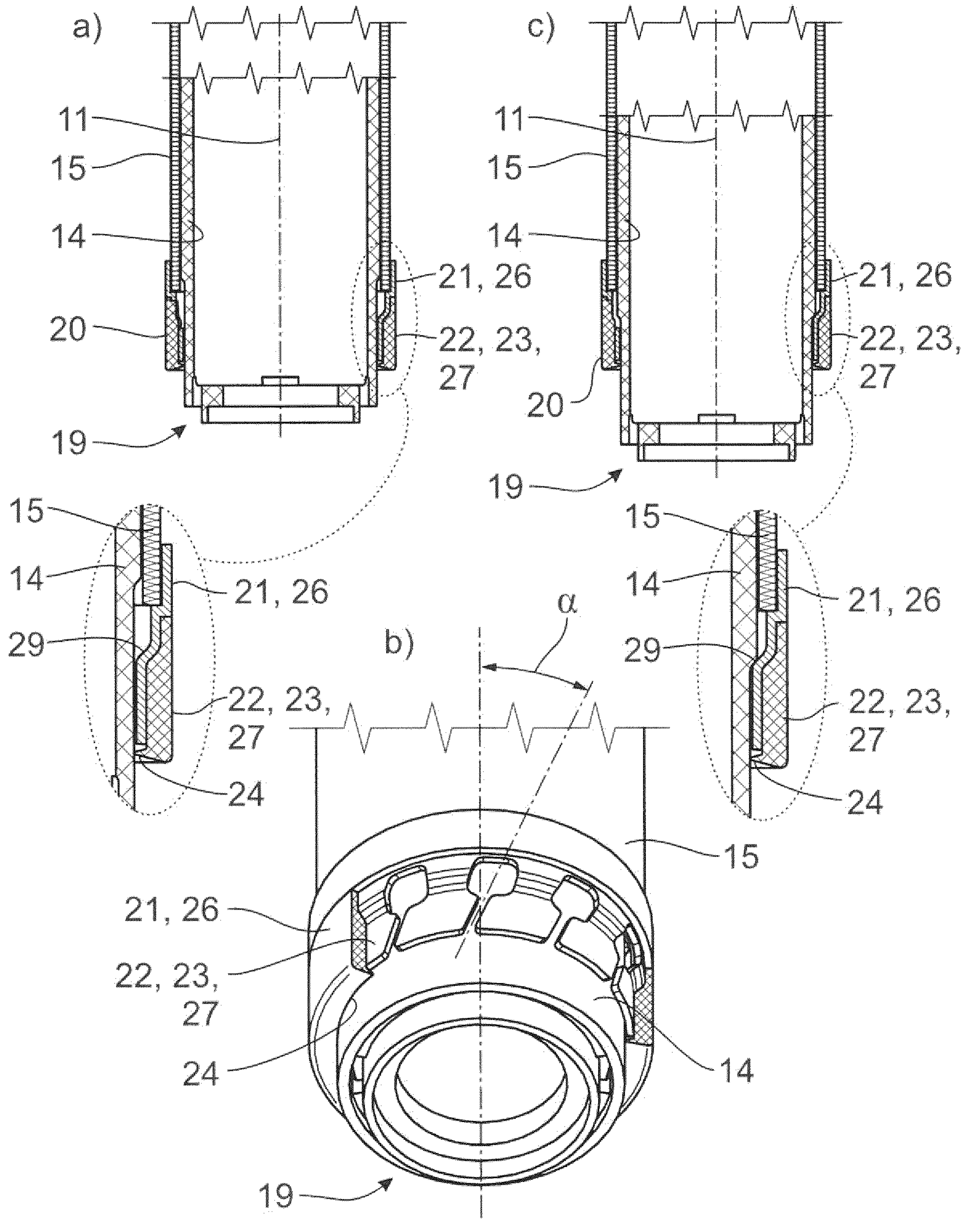
FIG. 3 shows various views of a sealing arrangement of the spindle drive from FIG. 1 with a ring portion of the sealing arrangement in a sealing position.
Figure 4:
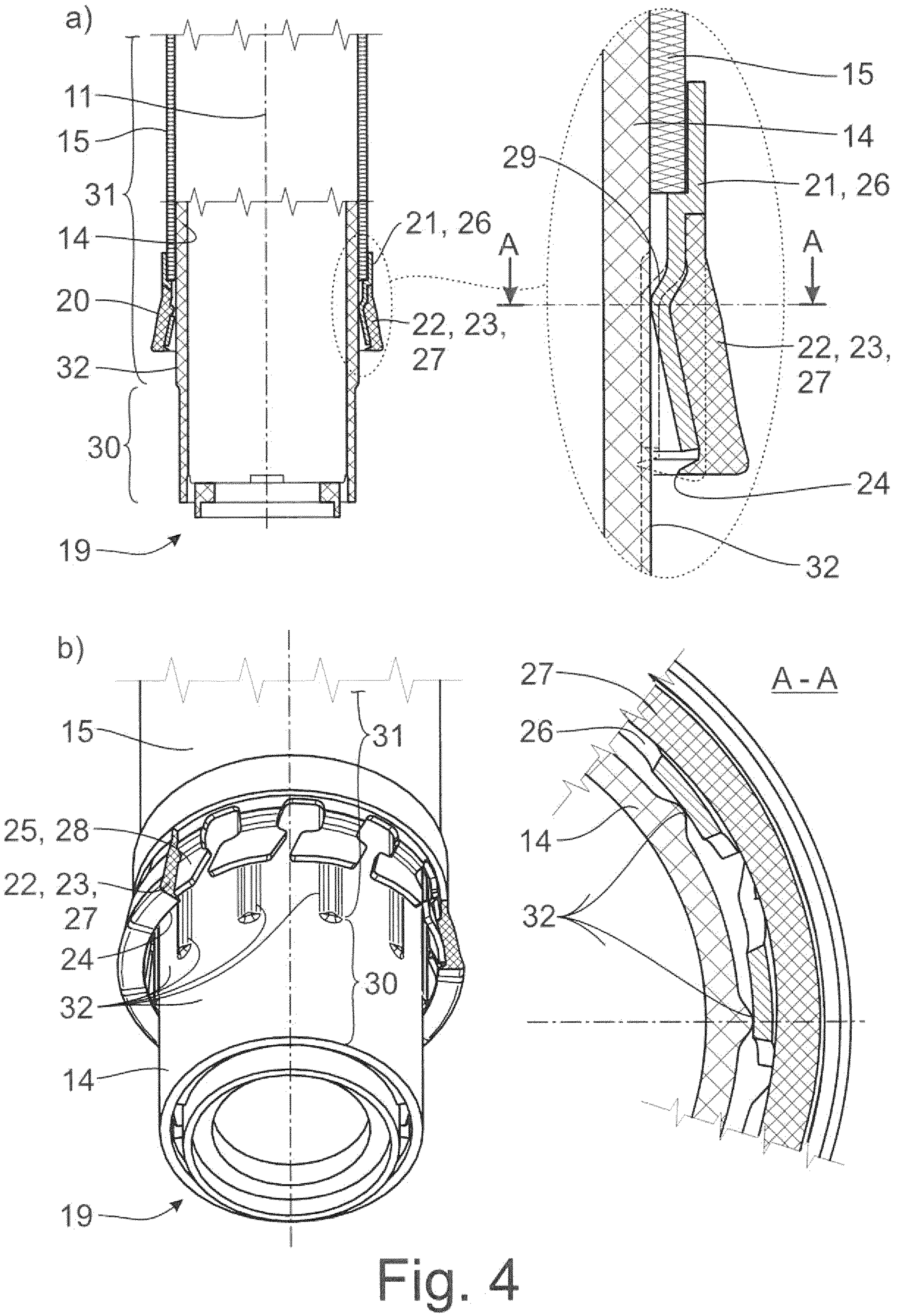
FIG. 4 shows various views of the sealing arrangement from FIG. 3 with the ring portion in a lift-off position.

As FIGS. 3 and 4 show, in some embodiments, the second axial ring portion 22 has an axial sealing portion 23 which presses on the respective tube of the spindle drive housing 13 with a greater radial contact force in the sealing position than in the lift-off position. In some embodiments, the axial sealing portion 23 has a sealing lip 24, circumferential to the geometric spindle axis 11, which is pressed onto the respective tube, here the inner tube 14, of the spindle drive housing 13 with a greater radial contact force in the sealing position than in the lift-off position.

For displacement, in particular pivoting, of the second axial ring portion 22 between the sealing position and the lift-off position, in some embodiments, the second axial ring portion 22 is formed from several circumferential segments 25 which are arranged circumferentially next to one another and are each displaceable, in particular pivotable about a geometric pivot axis which is tangential to the geometric spindle axis 11. FIG. 4 shows the displaced or pivoted state.

Furthermore, in some embodiments, it can be provided that the first axial ring portion 21 and/or the second axial ring portion 22 and/or the circumferential segments 25 are each formed from a hard component 26 and a soft component 27, which in particular together form an integral two-component injection molding. The sealing lip 24 is here also formed from the soft component 27. The terms "hard component" and "soft component" here mean that the material of the components differs significantly in its elasticity and/or Shore hardness, i.e. the modulus of elasticity differs by at least 100 $N/mm^2$, by at least 250 $N/mm^2$, or by at least 500 $N/mm^2$. A hard component is formed from a less elastic material, in particular a plastic material, than the soft component. A hard component, in some embodiments, means a component, in particular a plastic part, which has a modulus of elasticity of at least 1000 $N/mm^2$ and/or a Shore A hardness of at least 95, or at least 100, and/or a Shore C hardness of at least 45, or at least 70. A soft component, in some embodiments, means a component, in particular a plastic part, which has a modulus of elasticity of at most 500 $N/mm^2$ and/or a Shore A hardness of at most 85, or at most 75, and/or a Shore C hardness of at most 30, or at most 25.

In the exemplary embodiment shown here, the hard component 26 is made from a metal or a plastic material, in particular a glass-fiber-reinforced plastic material or polyamide. In addition or alternatively, as here, the soft component 27 may be made from a permanently elastic plastic material, in particular an elastomer, such as a thermoplastic elastomer defined to DIN EN ISO 18064; ISO 18064 or liquid silicone rubber (LSR).

FIGS. 3*b*) and 4*b*) furthermore show that, in some embodiments, the hard component 26 has several webs 28 circumferentially separated from one another. These can be embedded in the soft component 27, or the soft component 27 is applied, e.g. molded, onto the webs 28. In some embodiments, the soft component 27 is arranged continuously circumferentially to the geometric spindle axis 11, i.e. it connects the webs 28 together in the circumferential direction.

In some embodiments, the second axial ring portion 22 and/or the circumferential segments 25 each have an axial contact portion 29 which juts out relative to the first axial ring portion 21 and/or the geometric pivot axes, radially to the tube, here the inner tube 14 of the spindle drive housing 13, on which the annular sealing arrangement 20 slides during performance of the drive movements. The tube to which the axial contact portion 29 juts out, here the inner tube 14, also has an axial rest portion 30 for sealing contact of the sealing portion 23, and an adjacent axial running portion 31 which has axially extending contact ribs 32 protruding radially relative to the axial rest portion 30. In some embodiments, the axial contact portion 29 is formed by the hard component 26.

Furthermore, in some embodiments, it can be provided that, to ensure that the webs 28 come safely into contact with the contact ribs 32, they have a swirl-like course relative to the geometric spindle axis 11, here symbolized by the angle $\alpha$.

Furthermore, in some embodiments, it is provided that a first axial movement of the outer tube 15 relative to the inner tube 14, resulting from a drive movement of the spindle drive 1 out of the retracted position in the direction of the extended position, causes the radial displacement, in particular pivoting, of the second axial ring portion 22 from the sealing position into the lift-off position. Here, in the first axial relative movement, the axial contact portion 29 comes into contact with the axial running portion 31 such that the contact ribs 32 outwardly deflect the second axial ring portion 22 and/or each circumferential segment 25. In some embodiments, in the first axial relative movement, the deflection of the second axial ring portion 22 and/or the circumferential segments 25 causes the sealing lip 24 to lift off the rest portion 30 and, during the further course of the first axial relative movement, be guided along the contact ribs 32, in particular radially spaced therefrom. Thus, on extension of the spindle drive, the friction between the sealing arrangement 20 and the respective tube, here the inner tube 14, is substantially reduced.

Conversely, a second axial movement of the outer tube 15 relative to the inner tube 14, resulting from a drive movement of the spindle drive 1 out of the direction of the extended position into the retracted position, causes a return displacement, in particular a return pivoting, of the second axial ring portion 22 from the lift-off position into the sealing position. In the second axial relative movement, the axial contact portion 29 comes out of engagement with the axial running portion 31 such that the second axial ring portion 22 and/or the circumferential segments 25 can each spring back radially. In some embodiments, in the second axial relative movement, the springing back of the second axial ring portion 22 and/or the circumferential segments 25 causes the sealing lip 24 to come out of its lift-off state and back into contact with the rest portion 30. Thus an optimal seal is achieved in the retracted position of the spindle drive.

Furthermore, in some embodiments, it is provided that the sealing arrangement 20, in particular via the first axial ring portion 21, is fastened axially and rotationally fixedly to the outer tube 15 and, on performance of the drive movements, the second axial ring portion 22 can be displaced, in particular pivoted, radially outward relative to the first axial ring portion 21 from the sealing position into the lift-off position. According to an alternative not shown here, it may also be provided that the sealing arrangement 20, in particular via the first axial ring portion 21, is fastened axially and rotationally fixedly to the inner tube 14 and on performance of drive movements, the second axial ring portion 22 can be displaced, in particular pivoted, radially inward relative to the first axial ring portion 21 from the sealing position into the lift-off position. In some embodiments, the axially and rotationally fixed fastening is achieved by a substance-bonded connection, in particular by gluing or molding, and/or an axially form-fit connection, in particular by latching.

As FIG. 2 shows, in some embodiments, also a twist lock is provided between the inner tube 14 and outer tube 15, which is here formed in that the torsion tube 17, which is rotationally fixed relative to the one of the tubes, here the outer tube 15, and is axially fixed relative to the spindle 4*a* and here the drive motor 7, and the spindle nut tube 18, which is rotationally fixed relative to the other of the tubes, in particular the inner tube 14, and axially fixed relative to the spindle nut 4*b*, stand in form-fit engagement with one another. In principle however, it is also conceivable that the inner tube 14 and outer tube 15 themselves stand in form-fit engagement with one another.

The invention claimed is:

1. A spindle drive for a closing element of a motor vehicle, comprising a spindle-nut gear for performing linear drive movements of the spindle drive between a retracted position and an extended position, wherein a spindle-side drive portion of the spindle drive has a spindle of the spindle-nut gear, wherein a nut-side drive portion of the spindle drive has a spindle nut of the spindle-nut gear, wherein the two drive portions are each connected to a drive connection for coupling to the motor vehicle, wherein a spindle drive housing comprises an inner tube and an outer tube is provided, wherein the inner tube runs telescopically in the outer tube, wherein the outer tube or the inner tube has an annular sealing arrangement which is circumferential to the geometric spindle axis and slides along the respective other tube of the spindle drive housing during performance of drive movements, wherein the sealing arrangement has a first axial ring portion and, axially adjacent thereto relative to the geometric spindle axis, a second axial ring portion which is movably connected to the first axial ring portion, and that on performance of drive movements, the second axial ring portion is radially displaceable relative to the first axial ring portion between a sealing position in which a sealing effect of the sealing arrangement is greatest, and a lift-off position in which the sealing effect of the sealing arrangement is less than in the sealing position, and wherein, during at least a majority of the relative movement of the outer tube relative to the inner tube between the retracted position and the extended position, an axial contact portion of the second axial ring portion remains in contact with and is guided along the respective other tube of the spindle drive housing.

2. The spindle drive as claimed in claim 1, wherein an axial movement of the outer tube relative to the inner tube causes the radial displacement of the second axial ring portion between the sealing position and the lift-off position.

3. The spindle drive as claimed in claim 1, wherein the second axial ring portion has an axial sealing portion which presses on the respective tube of the spindle drive housing with a greater radial contact force in the sealing position than in the lift-off position.

4. The spindle drive as claimed in claim 3, wherein the axial sealing portion has a sealing lip circumferential to the geometric spindle axis which presses on the respective tube of the spindle drive housing with a greater radial contact force in the sealing position than in the lift-off position.

5. The spindle drive as claimed in claim 1, wherein for displacement of the second axial ring portion between the sealing position and the lift-off position, the second axial ring portion is formed by multiple circumferential segments which are arranged circumferentially next to one another and each displaceable.

6. The spindle drive as claimed in claim 5, wherein the second axial ring portion and/or the circumferential segments each have an axial contact portion which juts out relative to the first axial ring portion and/or the geometric pivot axes, radially to the tube of the spindle drive housing along which the annular sealing arrangement slides on performance of the drive movements, and that the tube to which the axial contact portion juts out has an axial rest portion for sealing contact of the sealing portion, and an adjacent axial running portion which has axially extending contact ribs protruding radially relative to the axial rest portion.

7. The spindle drive as claimed in claim 5, wherein the first axial ring portion and/or the second axial ring portion and/or the circumferential segments are each formed from a hard component and a soft component, which together form an integral two-component injection molding.

8. The spindle drive as claimed in claim 7, wherein the sealing lip is formed from the soft component.

9. The spindle drive as claimed in claim 7, wherein the hard component is made from a metal or a plastic material which has a lower modulus of elasticity and/or a higher Shore hardness than the soft component and/or that the soft component is made from a permanently elastic plastic material which has a higher modulus of elasticity and/or a lower Shore hardness than the hard component.

10. The spindle drive as claimed in claim 9, wherein the webs are embedded in the soft component or the soft component is applied onto the webs and wherein the soft component is arranged continuously circumferentially relative to the geometric spindle axis.

11. The spindle drive as claimed in claim 9, wherein the hard component has several webs spaced apart from one another circumferentially.

12. The spindle drive as claimed in claim 11, wherein the webs have a swirl-like course relative to the geometric spindle axis.

13. The spindle drive as claimed in claim 1, wherein a first axial movement of the outer tube relative to the inner tube, resulting from a drive movement of the spindle drive from the retracted position in the direction of the extended position, causes the radial displacement of the second axial ring portion from the sealing position into the lift-off position.

14. The spindle drive as claimed in claim 1, wherein a second axial movement of the outer tube relative to the inner tube, resulting from a drive movement of the spindle drive from the direction of the extended position into the retracted position, causes a return displacement of the second axial ring portion from the lift-off position into the sealing position.

15. The spindle drive as claimed in claim 1, wherein the sealing arrangement is fastened axially and rotationally fixedly on the outer tube, and during performance of the drive movements, the second axial ring portion is displaceable radially outwardly relative to the first axial ring portion from the sealing position into the lift-off position, or that the sealing arrangement is fastened axially and rotationally fixedly on the inner tube and during performance of the drive movements, the second axial ring portion is displaceable radially inwardly relative to the first axial ring portion from the sealing position into the lift-off position.

16. The spindle drive as claimed in claim 1, wherein the inner tube is connected to the nut-side drive portion and the outer tube is connected to the spindle-side drive portion.

17. The spindle drive as claimed in claim 1, wherein a twist lock is provided between the inner tube and outer tube, which is rotationally fixed relative to the one of the tubes and axially fixed relative to the spindle, and a spindle nut tube which is rotationally fixed relative to the other of the tubes and axially fixed relative to the spindle nut, stand in form-fit engagement with one another, or that the inner tube and the outer tube themselves stand in form-fit engagement with one another.

18. The spindle drive as claimed in claim 1, wherein the spindle-side drive portion has a drive unit with a drive motor, downstream of which the spindle is connected, and the drive unit and spindle-nut gear are arranged one behind the other along the geometric spindle axis, and/or that at least one coil spring is arranged inside the inner tube coaxially to the geometric spindle axis and preloads the two drive portions against one another.

19. The spindle drive as claimed in claim 1, wherein the spindle drive housing radially surrounds the spindle-nut gear, the drive motor, a torsion tube, the spindle nut tube and/or the at least one coil spring.

20. The spindle drive as claimed in claim 1, wherein for pivoting of the second axial ring portion between the sealing position and the lift-off position, the second axial ring portion is formed by multiple circumferential segments which are arranged circumferentially next to one another and each pivotable about a geometric pivot axis tangential relative to the geometric spindle axis.

* * * * *